United States Patent [19]

Coran et al.

[11] 4,141,878

[45] Feb. 27, 1979

[54] THERMOPLASTIC COMPOSITIONS OF CSM RUBBER AND POLYOLEFIN RESIN

[75] Inventors: Aubert Y. Coran; Raman Patel, both of Akron, Ohio

[73] Assignee: Monsanto Company, St. Louis, Mo.

[21] Appl. No.: 896,464

[22] Filed: Apr. 14, 1978

[51] Int. Cl.² ............................................. C08L 23/34
[52] U.S. Cl. ........................ 260/33.6 AQ; 260/28.5 A; 260/30.6 R; 260/30.8 R; 260/31.8 M; 260/33.6 PQ; 260/42.34; 260/897 C
[58] Field of Search ................... 260/897 C, 33.6 AQ, 260/33.6 PQ

[56] References Cited

U.S. PATENT DOCUMENTS

| | | | |
|---|---|---|---|
| 3,037,954 | 6/1962 | Gessler et al. | 260/29.8 |
| 3,639,529 | 2/1972 | MacKenzie, Jr. | 260/897 C |
| 3,816,347 | 6/1974 | Luh | 252/511 |

OTHER PUBLICATIONS

Du Pont Report BL-339, "Blends of Hypalon with other Elastomers and Plastics", pp. 1 and 7-9.

*Primary Examiner*—Carman J. Seccuro
*Attorney, Agent, or Firm*—Larry R. Swaney

[57] ABSTRACT

Thermoplastic compositions are described comprising blends of cross-linked CSM (chlorosulfonated polyethylene) rubber and thermoplastic crystalline polyolefin resin.

19 Claims, No Drawings

THERMOPLASTIC COMPOSITIONS OF CSM RUBBER AND POLYOLEFIN RESIN

This invention relates to thermoplastic compositions and, more particularly, to thermoplastic compositions comprising blends of polyolefin resin and cross-linked CSM rubber.

BACKGROUND OF THE INVENTION

Thermoplastics are compositions which can be molded or otherwise shaped and reprocessed at temperatures above their melting or softening point. Thermoplastic elastomers (elastoplastics) are materials which exhibit both thermoplastic and elastomeric properties, i.e., the materials process as thermoplastics but have physical properties like elastomers. Shaped articles may be formed from thermoplastic elastomers by extrusion, injection molding or compression molding without the time-consuming cure step required with conventional vulcanizates. Elimination of the time required to effect vulcanization provides significant manufacturing advantages. Further, thermoplastic elastomers can be reprocessed without the need for reclaiming and, in addition, many thermoplastics can be thermally welded.

SUMMARY OF THE INVENTION

It has been discovered that compositions comprising blends of thermoplastic crystalline polyolefin resin and cross-linked CSM rubber exhibit useful properties which properties vary depending on the proportion of crystalline polyolefin resin and cross-linked CSM rubber in the composition. Compositions containing crystalline polyolefin resin and cross-linked CSM rubber are moldable thermoplastic compositions exhibiting improved strength and greater toughness and impact resistance than similar compositions containing substantially uncross-linked rubber. Compositions comprising more than 50 percent by weight of crystalline polyolefin resin are thermoplastic compositions exhibiting improved impact resistance. Compositions comprising less than 50 percent by weight of crystalline polyolefin resin are elastoplastic, i.e., they exhibit elastomeric properties yet are processable as a thermoplastic. The amount of CSM rubber does not exceed 85 weight percent of the composition. If plasticizer is used, it can be present in amounts up to 200 parts by weight, preferably, 100 parts by weight, more preferably 60 parts by weight per 100 parts by weight of rubber.

A thermoplastic composition of the invention comprises a blend of thermoplastic crystalline polyolefin resin and CSM rubber cross-linked to the extent that no more than 40 percent, preferably no more than 20 percent and more preferably, 10 percent of the rubber is extractable in toluene at room temperature. Improved properties are exhibited by blends containing about 15 to about 65 parts by weight thermoplastic crystalline polyolefin resin and about 85 to about 35 parts by weight of cross-linked CSM rubber per 100 total parts by weight of polyolefin resin and CSM rubber. More preferred thermoplastic compositions contain no more than 60 parts by weight of polyolefin resin per 100 total parts by weight of polyolefin resin and CSM rubber.

Elastoplastic compositions in accordance with this invention are compositions comprising blends of (a) thermoplastic crystalline polyolefin resin in an amount sufficient to impart thermoplasticity up to 50 weight percent of the composition, (b) CSM rubber cross-linked to the extent that no more than 20 percent, preferably no more than 15 percent, and more preferably no more than 10 percent of the rubber is extractable in toluene, in an amount sufficient to impart rubberlike elasticity up to 85 weight percent of the composition, which compositions are processable as thermoplastics and are elastomeric. Preferred elastoplastic compositions of the invention comprise blends in which the amount of CSM rubber exceeds the amount of polyolefin resin, particularly blends of (a) about 20–50 parts by weight of thermoplastic polyolefin resin and (b) about 80–50 parts by weight of rubber per 100 total parts weight of polyolefin resin and CSM rubber. More preferred compositions comprise blends of about 20–45 parts by weight of the polyolefin resin and about 80–55 parts by weight of the CSM rubber per 100 total parts by weight of polyolefin resin and CSM rubber. The elastoplastic compositions are elastomeric; yet they are processable as thermoplastics even though the rubber is highly cross-linked even to a point where it is 90% or 95% or more insoluble in toluene at 23° C. Further, they retain thermoplasticity even when the CSM rubber is cross-linked to the extent that the rubber is essentially completely insoluble. The indicated relative proportions of polyolefin resin and CSM rubber are necessary to provide sufficient rubber to give elastomeric compositions and to provide sufficient polyolefin resin to give thermoplasticity. When the amount of cross-linked CSM rubber exceeds about 85 parts by weight per 100 parts total weight of polyolefin resin and rubber, there is insufficient polyolefin resin present to provide thermoplasticity. When the quantity of cross-linked CSM rubber, in the absence of plasticizer falls below about 50 parts by weight per 100 parts total weight of polyolefin resin and CSM rubber, or when the quantity of polyolefin resin exceeds 50 weight percent of the composition, hard, rigid compositions having reduced toughness are obtained. The blends of the invention are envisaged as comprising microsized particles of cross-linked CSM rubber dispersed throughout a continuous polyolefin resin matrix. Especially preferred compositions of the invention comprise dispersed cross-linked CSM rubber particles of 50 microns number average or less, preferably below 10 microns number average.

The thermoplastic elastomers of the invention are rubbery compositions in which the rubber portion of the blend is cross-linked to the extent that the rubber has a gel content of 80 percent or more. The properties of the compositions can be improved by further cross-linking the rubber until said rubber has a gel content of 90 percent or more. However, in this connection, essentially complete gelation of say 95 percent or more is not always a necessary criterion of a fully cured product because of differences in molecular weight, molecular weight distribution and other variables among different types of CSM rubbers which influence the gel determination. An effect of curing the composition is the very substantial improvements in mechanical properties which improvements directly relate to practical uses. Surprisingly, the high strength elastomeric compositions are still thermoplastic as contrasted to thermoset elastomers.

Thermoplastic compositions of the invention are preferably prepared by blending a mixture of CSM rubber, polyolefin resin and curatives in amounts sufficient to cure the rubber, then masticating the blend at a temperature sufficient to effect cross-link formation, using conventional masticating equipment, for example, Banbury mixer, Brabender mixer, or certain mixing extruders. The polyolefin resin and CSM rubber are mixed at a temperature sufficient to soften the polyolefin resin or, more commonly, at a temperature above its melting point. After the polyolefin resin and CSM rubber are intimately mixed, curative is added. Heating and masticating at vulcanization temperatures are generally adequate to complete the cross-link formation in a few minutes or less, but if shorter times are desired, higher temperatures may be used. A suitable range of temperatures for cross-link formation is from about the melting temperature of the polyolefin resin to the decomposition temperature of the CSM rubber which range commonly is from about 110° C. to 250° C. with the maximum temperature varying somewhat depending on the type of rubber, the presence of antidegradants and the mixing time. Typically, the range is from about 160° C. to 220° C. A preferred range of temperatures is from about 180° C. to about 210° C. Blends are treated with curatives in amounts and under time and temperature conditions known to give cured products from static cures of the rubber in molds and, indeed, the rubber has undergone gelation to the extent characteristic of rubber subjected to a similar treatment alone. Thermosets are avoided in the compositions of the invention by simultaneously masticating and curing the blends. To obtain thermoplastic compositions, it is important that mixing continues without interruption until cross-linking occurs. If appreciable cross-linking is allowed after mixing has stopped, a thermoset unprocessable composition may be obtained. A few simple experiments within the skill of the art utilizing available rubbers and curative systems will suffice to determine their applicability for the preparation of the improved products of this invention. For additional information on dynamic cross-linking processes, see Gessler and Haslett, U.S. Pat. No. 3,037,954.

Methods other than the dynamic vulcanization of rubber/polyolefin resin blends can be utilized to prepare compositions of the invention. For example, the CSM rubber can be fully vulcanized either dynamically or statically, in the absence of the polyolefin resin, powdered, and mixed with the polyolefin resin at a temperature above the melting or softening point of the polyolefin resin. Provided that the cross-linked CSM rubber particles are small, well dispersed and in an appropriate concentration, compositions within the invention are easily obtained by blending cross-linked CSM rubber and polyolefin resin. Accordingly, the term "blend" herein means a mixture comprising well dispersed small particles of cross-linked rubber. A mixture which is outside of the invention because it contains poorly dispersed or too large rubber particles can be comminuted by cold milling (to reduce particle size to below about 50 microns number average), preferably below 20 micron number average and more preferably to below 5 micron number average. After sufficient comminution or pulverization, a composition of the invention is obtained. Frequently, the case of poor dispersion or too large rubber particles is visibly obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

The compositions of the invention are all processable in an internal mixer, to products which, upon transferring at temperatures above the softening or crystallizing points of the polyolefin resin, to the rotating rolls of a rubber mill, form continuous sheets. The sheets are reprocessable in the internal mixer, after reaching temperatures above the softening or melting points of the polyolefin resin. The material is again transformed to the plastic state (molten state of the polyolefin resin) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, elastoplastic compositions of the invention are further processable to the extent that articles may be formed therefrom by extrusion, injection molding or calendering.

An improved thermoplastic composition is produced by cross-linking the rubber of a blend to the extent that the composition contains no more than about 40 percent by weight of the CSM rubber extractable in toluene at room temperature, and preferably to the extent that the composition contains less than 20 percent by weight extractable and more preferably less than 10 percent by weight extractable. In general, the less extractables the better are the properties, however, respectable properties are obtained with high extractables, but for applications involving contact with organic solvents more preferable compositions comprise low quantities of extractable rubber. The amount of CSM rubber extractable is determined by soaking a thin specimen (about 0.2 mm thick) for 48 hours in toluene at room temperature and weighing the dried (to constant weight) specimen and making suitable corrections based upon knowledge of the composition. Thus, corrected initial and final weights are obtained by subtracting from the initial weight, the weight of soluble components, other than the rubber, such as extender oils, plasticizers and components of the polyolefin resin soluble in the solvent. Any insoluble pigments, fillers, etc., including insoluble polyolefin resin, are subtracted from both the initial and final weights.

In should not be assumed that the curative does not react with the polyolefin resin or that there is no reaction between the polyolefin resin and rubber. There may be highly significant reactions involved but of limited extent. However, the fact that a large proportion of the polyolefin resin can be removed from the composition by extraction with a solvent for the polyolefin resin such as boiling xylene indicates that no extensive cross-linking of the polyolefin resin has occurred.

Rubber satisfactory for the practice of the invention comprise essentially random noncrystalline, rubbery chlorosulfonated polyethylene which rubber is commonly called and herein and in the claims shall be referred to as "CSM rubber." CSM rubber may be prepared by chlorosulfonation of polyethylene by reaction with chlorine and sulfur dioxide in the presence of a free-radical catalysis. The elastomer products contain from 15-50% chlorine and 0.5-3.0 percent sulfur. Typically, CSM rubber has a chlorine content of 20-45 percent and a sulfur content of 1-2.5 percent.

Any curing system suitable for curing CSM rubber may be used in the practice of this invention. Typical curing systems are based on a polybasic metal oxide or polybasic metal salt, ordinarily, used in conjunction with an organic accelerator. Examples of satisfactory curing system components are litharge, tribasic lead maleate, magnesium oxide, pentaerthritol, benzothiazyl disulfide, epoxy curing resin, phenolic curing resin, m-phenylene bis-maleimide, thiuram disulfide and dipentamethylene-thiuram hexasulfide. Sufficient quantities of curatives are used to cross-link the rubber to the extent necessary to achieve the desired extent of cure. High energy radiation is also utilizable as the curative means. For additional information concerning CSM rubber see Encyclopedia of Polymer Science and Technology, Interscience Publishers, V.6, pages 442–449. Commercially available CSM rubbers suitable for the practice of the invention are described in Rubber World Blue Book, 1975 Edition, Materials and Compounding Ingredients for Rubber, page 401.

Suitable thermoplastic polyolefin resins comprise crystalline, high molecular weight solid products from the polymerization of one or more monoolefins by either high pressure or low pressure processes. Examples of such resins are the isotactic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resins, and preferably polyethylene or polypropylene, may be advantageously used in the practice of the invention, with polyethylene being preferred.

One aspect of the invention comprises adding a rubber plasticizer to the blend which plasticizer extends the range of proportions of polyolefin resin to rubber in the composition while still retaining elastoplasticity. For example, without plasticizer the weight of polyolefin resin cannot exceed the weight of rubber without losing rubberlike elasticity, whereas, with plasticizer the weight of polyolefin resin may exceed the weight of rubber. Generally, the quantity of plasticizer when present may be as high as 40 weight percent of the total composition. Any rubber plasticizer may be used but aromatic processing oil is preferred. Suitable plasticizers include phthalate esters such as dicyclohexyl phthalate, dimethyl phthalate, dioctyl phthalate, butyl benzyl phthalate, benzyl phthalate, phosphates such as tributoxyethyl phosphate, tributyl phosphate, tricresyl phosphate, cresyl diphenyl phosphate, 2-ethylhexyl diphenyl phosphate, isodecyl diphenyl phosphate, and triphenyl phosphate, phthalyl glycolates such as butyl phthalyl butyl glycolate and methyl ethyl glycolate, sulfonamides such as N-cyclohexyl-p-toluenesulfonamide, N-ethyl-o,p toluenesulfonamide, o,p-toluenesulfonamide and o-toluene sulfonamide, butyl oleate, chlorinated waxes and naphthenic extender oils.

The properties of the thermoplastic compositions of this invention may be modified, either before or after vulcanization, by addition of ingredients which are conventional in the compounding of CSM rubber, polyolefin resin and blends thereof. Examples of such ingredients include carbon black, silica, titanium dioxide, magnesia, colored pigments, clay, stabilizers, antidegradants, processing aids, adhesives, tackifiers, rubber plasticizers, wax, discontinuous fibers such as wood cellulose fibers and extender oils. The addition of carbon black, rubber plasticizer or both, preferably prior to dynamic vulcanization, are particularly recommended. Preferably, the carbon black and/or rubber plasticizer is masterbatched with the rubber and the masterbatch is mixed with the polyolefin resin. Carbon black improves the tensile strength and rubber plasticizer can improve the resistance to oil swell, heat stability, hysteresis, cost and permanent set of the elastoplastic compositions. Plasticizers can also improve processability. For suitable plasticizers, refer to Rubber World Blue Book, supra, pages 145–190. The quantity of plasticizer added depends upon the properties desired, with the upper limit depending upon the compatibility of the particular plasticizer and blend ingredients which limit is exceeded when excessive exuding of plasticizer occurs. Typically, up to 50 parts by weight plasticizer are added per 100 parts by weight of rubber and polyolefin resin. Commonly, up to 60 parts by weight of plasticizer are added per 100 parts by weight of CSM rubber in the blend with quantities of about 20–50 parts by weight of plasticizer per 100 parts by weight of rubber being preferred. Typical additions of particulate fillers or reinforcement fillers such as carbon black comprise about 20–150 parts by weight of carbon black per 100 parts by weight of rubber and usually about 25–100 parts by weight carbon black per 100 parts total weight of rubber and plasticizer. The amount of carbon black which can be used depends, at least in part, upon the type of black and the amount of plasticizer to be used. The amount of plasticizer depends, at least in part, upon the type of rubber.

Thermoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with thermoplastics, in particular, polyolefin resin. The compositions of the invention are blended with thermoplastics using conventional mixing equipment. The properties of the blend depend upon the proportions. Generally, the amount is such that the blend contains sufficient cross-linked rubber to obtain the desired effect.

The stress-strain properties of the compositions are determined in accordance with the test procedures set forth in ASTM D638 and ASTM D1566. The term "elastomeric" as used herein and the claims means a composition which possesses the property of forcibly retracting within ten minutes to less than 160% of its original length after being stretched at room temperature to twice its length and held for ten minutes before release. Especially preferred compositions of the invention are rubbery compositions having tension set values of about 50% or less which compositions approximate the definition for rubber as defined by ASTM Standards, V.28, p. 756 (D1566). More preferred compositions are rubbery compositions having a Shore D hardness of 60 or below or a 100% modulus of 150 Kg./cm$^2$ or less or a Young's modulus below 2500 Kg./cm$^2$.

DESCRIPTION OF PREFERRED EMBODIMENTS

A typical procedure for the preparation of compositions of the invention comprises mixing in the indicated proportions CSM rubber and polyolefin resin in a Brabender mixer with an oil bath temperature of 180° C. for a time sufficient, usually between 2–6 minutes, to melt the polyolefin resin and to form a blend. The mixing temperature will be understood to be the temperature of the oil bath with the realization that the actual temperature of the mixture may vary. Curatives are added to cross-link the rubber, and mixing is continued until a maximum Brabender consistency is reached, usually between 1-5 minutes, and for an additional one or two minutes thereafter. The order of mixing can vary but all the ingredients should be added and mixed before substantial vulcanization occurs. The vulcanized but thermoplastic composition is removed, pressed into a sheet or sheeted on a mill, returned to the Brabender and mixed at the same temperature for two minutes. The material is again sheeted and then compression molded at 200°-220° C. and cooled below 100° C. under pressure before removal. Properties of the molded sheet are measured and recorded. The aforesaid procedure is followed below unless stated otherwise.

Polyolefin resins used to illustrate the invention are low flow, general purpose polypropylene, specific gravity 0.902, 11% yield elongation and polyethylene, ASTM D1248-72, type IV, melt index 0.6 and density 0.960 g/cm$^3$.

Four different CSM rubbers (commercially available under the trade name Hypalon) are used to illustrate the invention. The composition and properties of the rubbers are as follows:

| | Cl Wt. % | S Wt. % | Mooney Viscosity ML1+4, 100° C. | Specific Gravity |
|---|---|---|---|---|
| Hypalon 20 | 29 | 1.4 | 30 | 1.14 |
| Hypalon 40 | 35 | 1.0 | 55 | 1.18 |
| Hypalon 48 | 43 | 1.0 | 77 | 1.27 |
| Hypalon 4085 | 35 | 1.0 | 85 | 1.18 |

The uncured CSM rubber is supplied in the form of chips except when the trade name is followed by the suffix E which indicates the product form is talc dusted pellets.

The weight percent of soluble rubber in a blend is determined by soaking a blend specimen in the form of a thin film (about 0.13-0.18 mm thick) in toluene at room temperature for 48 hours, removing the specimen and drying to constant weight. From the initial weight, final dried weight, and knowledge of the composition, the weight percent of the soluble rubber is calculated. It is assumed that curative is bound to the cross-linked rubber and is not extracted by the toluene.

contain curative. The curative consists of 3 parts magnesium oxide (MgO), 3 parts pentaerthritol (Penta), 2 parts tetramethylthiuram disulfide (TMTD), and 1 part sulfur(S) per 100 parts by weight of CSM rubber. The blends are prepared by the typical procedure using a Brabender mixing speed of 80 rpm. The properties of the composition are shown in Table 1. The data show that cross-linking the rubber in compositions containing 40 parts by weight or more rubber per 100 total parts by weight of rubber and polyolefin resin increases the elongation and tensile strength of the blend. The tension set data show that, when the blends contain 50 parts by weight or more rubber per 100 total parts by weight of rubber and polyolefin resin, elastomeric compositions are obtained. All the compositions are processable as a thermoplastic including sample 7B containing 80 parts rubber per 100 total parts rubber and polypropylene and in which the rubber is 93% gelled. Although it contains a high proportion of cured rubber, the thermoplasticity of the composition is retained, it is believed, due to the cured rubber being in the form of dispersed small particles.

Compositions of the invention containing different types of CSM rubber are illustrated in Table 2. Samples 1-5 contain 60 parts by weight CSM rubber and 40 parts by weight polypropylene. Samples 6-10 contain 60 parts by weight CSM rubber and 40 parts by weight polyethylene. Samples designated A are controls containing no curative and samples designated B contain curatives. The ingredients and the amount of ingredients of the curative system are the same as in Table 1. The blends are prepared by the typical procedure except, after the polyolefin resin was melted and blended with the rubber, the magnesium oxide is added; after mixing 1 minute, the sulfur and tetramethyl thiuram disulfide are added; after mixing 1 minute, the pentaerythritol is added. The properties of the compositions are shown in Table 2. The data show that cross-linking the rubber increases elongation at break and tensile strength and that the compositions containing cross-linked rubber are elastomeric. The data show also that compositions containing polyethylene exhibit greater elongations. Blends containing low Mooney viscosity rubber, samples 4 and 9, exhibit a greater increase in tensile strength upon cross-linking the rubber.

TABLE 1

| Sample | CSM Rubber,pbw | PP, pbw | TS, Kg./cm2 | M100, Kg./cm2 | E, Kg./cm2 | Elong., % | Ten.Set, % | Hardness, Shore A | Hardness, Shore D | Solubility,Wt.% of Blend | Solubility,Wt.% of rubber |
|---|---|---|---|---|---|---|---|---|---|---|---|
| 1A | 10 | 90 | 188 | 189 | 8826 | 360 | br. | 100 | 70 | 4 | 38 |
| 1B | 10 | 90 | 195 | 190 | 7277 | 140 | br. | 98 | 69 | 2 | 18 |
| 2A | 25 | 75 | 197 | 166 | 6568 | 500 | br. | 100 | 65 | 21 | 85 |
| 2B | 25 | 75 | 172 | 170 | 6474 | 170 | br. | 98 | 67 | 3 | 13 |
| 3A | 40 | 60 | 129 | 130 | 2919 | 180 | 77 | 99 | 60 | 36 | 91 |
| 3B | 40 | 60 | 161 | 147 | 3418 | 250 | 62 | 98 | 62 | 4 | 10 |
| 4A | 50 | 50 | 109 | 109 | 2518 | 200 | 84 | 95 | 55 | 48 | 96 |
| 4B | 50 | 50 | 151 | 125 | 2142 | 260 | 54 | 98 | 55 | 5 | 10 |
| 5A | 60 | 40 | 87 | — | 1267 | 90 | br. | 95 | 46 | 58 | 97 |
| 5B | 60 | 40 | 172 | 108 | 1368 | 350 | 44 | 98 | 50 | 5 | 8 |
| 6A | 70 | 30 | 33 | 35 | 224 | 270 | 58 | 85 | 27 | 68 | 97 |
| 6B | 70 | 30 | 161 | 85 | 713 | 330 | 28 | 95 | 43 | 5 | 8 |
| 7A | 80 | 20 | 16 | 10 | 38 | 1000+ | 33 | 60 | 15 | 76 | 95 |
| 7B | 80 | 20 | 126 | 56 | 267 | 270 | 15 | 87 | 37 | 6 | 7 |
| 8A | 40 | 60* | 100 | 101 | 3316 | 140 | br. | 99 | 57 | 18 | 46 |
| 8B | 40 | 60* | 126 | 126 | 2834 | 280 | 72 | 99 | 55 | 3 | 7 |

*polyethylene

The effect of cross-linking the CSM rubber and the effect of the relative proportion of polyolefin resin and CSM rubber are shown in Table 1. The CSM rubber is Hypalon 4085E. The polyolefin resin is polypropylene in Samples 1-14 and polyethylene in Samples 15-16. The amounts are in parts by weight. Samples designated A are controls without curative; samples designated B The invention is illustrated using different curatives in Table 3. Tetrone A is pentamethylene thiuram hexasulfide, HVA-2 is m-phenylene bismaleimide, SP1045 is nonhalogenated phenolic curing resin, SnCl$_2$ is hydrated stannous chloride, MBTS is 2-bis-benzothiazolyl disulfide, Novar 920 and 924 are urethane type cross-linking agents and ZMDC is zinc dimethyldithiocarbamate. All compositions contain 60 parts by weight CSM rubber (Hypalon 4085E) and 40 parts by weight polypropylene. Sample 1 is a control containing no curative. The blends are prepared in the typical procedure with the curatives added together. The data show that a variety of curatives are effective for preparing compositions of the invention. The data show that curing the rubber increases the tensile strength, reduces the proportion of soluble rubber, and improves the tension set to the extent that the composition becomes elastomeric. Curing the rubber also increases the ultimate elongation except when a phenolic curing resin is used. All of the compositions process as a thermoplastic.

The effect of curative level is illustrated in Table 4. Compositions are prepared by the typical procedure by masticating in a Brabender mixer at 180° C. at 80 rpm, 60 parts by weight CSM rubber (Hypalon 4085E) and 40 parts by weight of polypropylene (same as before). Stock 1, a control, contains no curatives. In the other stocks, the amount of curative is varied as indicated. All parts are by weight. The data show that amount of rubber extractable in toluene decreases with increasing amounts of curative and that tensile strength increases proportionally with the extent of cure. The data further show that in order to obtain elastomeric compositions that the rubber must be cured to the extent that about 20 weight percent of the rubber or less is extractable in toluene.

TABLE 2

| Sample | CSM Rubber | Polyolefin Resin | TS, Kg./cm2 | M100, Kg./cm2 | E, Kg./cm2 | Elong., % | Ten.Set, % | Hardness, Shore A | Hardness, Shore D | Solubility,Wt.% of Blend | Solubility,Wt.% of rubber |
|---|---|---|---|---|---|---|---|---|---|---|---|
| 1A | 40E | PP | 98 | 101 | 1620 | 140 | broke | 95 | 45 | 44 | 74 |
| 1B | 40E | PP | 124 | 105 | 1304 | 240 | 49 | 98 | 52 | 9 | 16 |
| 2A | 40 | PP | 89 | 90 | 1583 | 140 | broke | 96 | 45 | 58 | 96 |
| 2B | 40 | PP | 118 | 111 | 1454 | 260 | 47 | 98 | 50 | 7 | 12 |
| 3A | 48 | PP | 107 | 168 | 2089 | 170 | broke | 98 | 52 | 56 | 93 |
| 3B | 48 | PP | 143 | 127 | 1800 | 200 | 54 | 98 | 57 | 7 | 12 |
| 4A | 20 | PP | 35 | — | 380 | 60 | broke | 87 | 30 | 56 | 93 |
| 4B | 20 | PP | 132 | 115 | 1288 | 180 | 40 | 98 | 51 | 4 | 8 |
| 5A | 4085E | PP | 92 | 96 | 1657 | 180 | 71 | 95 | 42 | 58 | 96 |
| 5B | 4085E | PP | 163 | 114 | 1487 | 290 | 43 | 98 | 52 | 4 | 7 |
| 6A | 40E | PE | 69 | 67 | 1438 | 150 | broke | 98 | 45 | 58 | 97 |
| 6B | 40E | PE | 134 | 97 | 1310 | 300 | 52 | 97 | 45 | 5 | 9 |
| 7A | 40 | PE | 76 | 85 | 1854 | 250 | 83 | 97 | 43 | 58 | 96 |
| 7B | 40 | PE | 141 | 100 | 1255 | 280 | 51 | 98 | 47 | 4 | 7 |
| 8A | 48 | PE | 90 | 88 | 1988 | 540 | 82 | 99 | 50 | 59 | 98 |
| 8B | 48 | PE | 150 | 110 | 1684 | 290 | 57 | 98 | 52 | 5 | 10 |
| 9A | 20 | PE | 38 | — | 675 | 70 | broke | 91 | 35 | 57 | 95 |
| 9B | 20 | PE | 155 | 102 | 1169 | 280 | 47 | 97 | 45 | 3 | 4 |
| 10A | 4085E | PE | 74 | 77 | 1708 | 220 | broke | 98 | 45 | 57 | 95 |
| 10B | 4085E | PE | 139 | 93 | 1396 | 340 | 48 | 98 | 47 | 3 | 5 |

TABLE 3

| Sample | Curative parts per 100 parts rubber | | | | TS, Kg./cm2 | M,100 Kg./cm2 | E, Kg./cm2 | Elong., % | Ten.set, % | Solubility Wt. % rubber |
|---|---|---|---|---|---|---|---|---|---|---|
| 1 | none | | | | 71 | 72 | — | 220 | 79 | 96 |
| 2 | Mgo 3 | Penta 3 | TMTD 2 | S 1 | 185 | 135 | 1221 | 330 | 40 | 7 |
| 3 | 4 | 3 | Tetrone-A 2 | — | 139 | 103 | — | 340 | 43 | 10 |
| 4 | 4 | 3 | 2 | HVA-2 1 | 148 | 118 | — | 250 | 42 | 8 |
| 5 | 4 | 3 SP1045 | 1.5 SnCl2 | MBTS 0.5 | 143 | 100 | — | 390 | 41 | 11 |
| 6 | 4 Novar 920 | 5 Novar 924 | 2 ZMDC | — | 166 | 154 | 1480 | 130 | 38 | 10 |
| 7 | 4 | 8 | 2 | 0.5 | 151 | 101 | — | 430 | 44 | 18 |

TABLE 4

| Stocks | 1 | 2 | 3 | 4 | 5 | 6 | 7 | 8 | 9 |
|---|---|---|---|---|---|---|---|---|---|
| Curatives | | | | | | | | | |
| Mgo | — | 0.1125 | 0.225 | 0.45 | 1.80 | 0.90 | 1.8 | 1.8 | 1.8 |
| Pentaerthritol | — | 0.1125 | 0.225 | 0.45 | 0.45 | 0.90 | 0.9 | 1.35 | 1.8 |
| TMTD | — | 0.075 | 0.15 | 0.30 | 0.30 | 0.60 | 0.60 | 0.90 | 1.20 |
| Sulfur | — | 0.0375 | 0.075 | 0.15 | 0.15 | 0.30 | 0.30 | 0.45 | 0.60 |
| Properties | | | | | | | | | |
| TS, Kg/cm$^2$ | 72 | 112 | 121 | 132 | 137 | 143 | 146 | 158 | 185 |
| M 100, Kg/cm$^2$ | 72 | 113 | 121 | 118 | 101 | 131 | 103 | 109 | 135 |
| E, Kg./cm$^2$ | 1164 | 2444 | 2091 | 1960 | 1408 | 1911 | 1520 | 1400 | 1221 |
| UE, % | 194 | 264 | 268 | 326 | 379 | 235 | 324 | 298 | 325 |
| Shore A | 95 | 97 | 98 | 97 | 98 | 98 | 98 | 97 | 98 |
| Shore D | 45 | 52 | 55 | 50 | 50 | 53 | 52 | 50 | 52 |
| 10' Ten. Set, % | 79 | 71 | 63 | 53 | 50 | 48 | 47 | 43 | 40 |
| Toluene Extractables as wt. % of composition | 58.5 | 22.9 | 17.1 | 13.3 | 10.3 | 7.3 | 6.2 | 4.4 | 4.0 |
| Toluene extractables as wt. % of rubber | 97.5 | 38.3 | 28.7 | 22.5 | 17.6 | 12.6 | 10.7 | 7.7 | 7.1 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A thermoplastic composition comprising a blend of about 15 to about 65 parts by weight thermoplastic crystalline polyolefin resin and about 85 to about 35 parts by weight cross-linked chlorosulfonated polyethylene rubber per 100 total parts by weight polyolefin resin and chlorosulfonated polyethylene rubber, in which the chlorosulfonated polyethylene rubber is cross-linked to the extent that no more than forty weight percent of the rubber is extractable in toluene.

2. The composition of claim 1 in which the polyolefin resin is polyethylene or polypropylene.

3. The composition of claim 2 in which the chlorosulfonated polyethylene rubber is cross-linked to the extent that no more than twenty weight percent of the rubber is extractable in toluene.

4. The composition of claim 3 comprising about 20 to about 60 parts by weight polyolefin resin and about 80 to about 40 parts by weight chlorosulfonated polyethylene rubber.

5. The composition of claim 4 in which the chlorosulfonated polyethylene rubber is in the form of dispersed particles of a size of 50 microns number average or less.

6. The composition of claim 5 in which the polyolefin resin is polyethylene.

7. The composition of claim 5 in which the polyolefin resin is polypropylene.

8. An elastoplastic composition comprising thermoplastic crystalline polyolefin resin in an amount sufficient to impart thermoplasticity up to 50 weight percent of the composition, chlorosulfonated polyethylene rubber cross-linked to the extent that no more than twenty weight percent of the rubber is extractable in toluene, in an amount sufficient to impart rubberlike elasticity up to 85 weight percent of the composition, which composition is elastomeric and processable as a thermoplastic.

9. The composition of claim 8 comprising a blend of about 15 to about 50 parts by weight polyolefin resin and about 85 to about 50 parts by weight of chlorosulfonated polyethylene rubber per 100 total parts by weight polyolefin resin and chlorosulfonated polyethylene rubber.

10. The composition of claim 9 in which the polyolefin resin is polyethylene or polypropylene.

11. The composition of claim 10 in which the chlorosulfonated polyethylene rubber is cross-linked to the extent that no more than ten weight percent of the rubber is extractable in toluene.

12. The composition of claim 11 comprising about 20–45 parts by weight polyolefin resin and about 80–55 parts by weight chlorosulfonated polyethylene rubber per 100 parts by weight of polyolefin resin and chlorosulfonated polyethylene rubber combined.

13. The composition of claim 12 in which the chlorosulfonated polyethylene rubber is in the form of dispersed particles of a size of 50 microns number average or less.

14. The composition of claim 13 in which the size of the dispersed cross-linked chlorosulfonated polyethylene rubber particles is below 10 microns number average.

15. The composition of claim 14 in which the polyolefin resin is polyethylene.

16. The composition of claim 14 in which the polyolefin resin is polypropylene.

17. The composition of claim 8 which contains up to 60 parts by weight rubber plasticizer per 100 parts by weight of chlorosulfonated polyethylene rubber.

18. The composition of claim 17 in which the plasticizer is aromatic processing oil.

19. The composition of claim 17 in which the combined weight of plasticizer and chlorosulfonated polyethylene rubber exceeds the weight of polyolefin resin but does not exceed 85 weight percent of the composition.

* * * * *